(12) United States Patent
Chaves et al.

(10) Patent No.: US 10,009,057 B2
(45) Date of Patent: Jun. 26, 2018

(54) PROTECTIVE FILMS FOR ELECTRONIC DEVICES

(71) Applicant: ZAGG Intellectual Property Holding Co., Inc., Salt Lake City, UT (US)

(72) Inventors: Timothy Andrew Chaves, Orem, UT (US); Steven Smith Fellows, Springville, UT (US)

(73) Assignee: ZAGG Intellectual Property Holding Co., Inc., Salt Lake City, UT (US)

( * ) Notice: Subject to any disclaimer, the term of this patent is extended or adjusted under 35 U.S.C. 154(b) by 0 days. days.

(21) Appl. No.: 14/878,451

(22) Filed: Oct. 8, 2015

(65) Prior Publication Data

US 2016/0028431 A1 Jan. 28, 2016

Related U.S. Application Data

(63) Continuation of application No. 13/223,713, filed on Sep. 1, 2011.

(Continued)

(51) Int. Cl.
*C09J 7/00* (2018.01)
*G06F 1/16* (2006.01)
(Continued)

(52) U.S. Cl.
CPC .......... *H04B 1/3888* (2013.01); *C09J 7/0239* (2013.01); *G06F 1/1637* (2013.01); *Y10T 29/49826* (2015.01)

(58) Field of Classification Search
USPC ................... 156/60, 247, 249, 289; 428/40.1
See application file for complete search history.

(56) References Cited

U.S. PATENT DOCUMENTS 3,987,569 A * 10/1976 Chase ...................... A47G 1/17
40/769
RE33,353 E 9/1990 Heinecke
(Continued)

FOREIGN PATENT DOCUMENTS

JP 2002-297041 10/2002
KR 10-2005-0093046 9/2005
(Continued)

OTHER PUBLICATIONS

Korean Intellectual Property Office as the International Searching Authority, "International Search Report and Written Opinion," dated Apr. 12, 2012, in corresponding PCT application No. PCT/US2011/050216.

*Primary Examiner* — Sing P Chan
(74) *Attorney, Agent, or Firm* — Durham Jones & Pinegar, P.C. Intellectual Property Law Group

(57) ABSTRACT

A system for protecting a surface of an electronic device includes a protective film and a liner. The protective film includes an adhesive-coated surface. The liner, which covers the adhesive-coated surface until the protective film is secured to the surface of an electronic device, includes a main element that covers a majority of the adhesive-coated surface and a strip element that covers a smaller strip of the adhesive-coated surface, which strip is located adjacent to an edge of the adhesive-coated surface. One or both of the strip element and the main element of the liner may also include a tab for facilitating their removal from the adhesive-coated surface of the protective film. Methods for using the system to apply a protective film to a surface, such as a surface of a display screen, of an electronic device are also disclosed.

22 Claims, 2 Drawing Sheets

Related U.S. Application Data

(60) Provisional application No. 61/379,151, filed on Sep. 1, 2010.

(51) Int. Cl.
*H04B 1/3888* (2015.01)
*C09J 7/02* (2006.01)

(56) References Cited

U.S. PATENT DOCUMENTS

| | | | | |
|---|---|---|---|---|
| 5,498,455 | A | * | 3/1996 | Roberts ............ A47G 1/175 40/773 |
| 6,008,429 | A | | 12/1999 | Ritger |
| 6,159,497 | A | | 12/2000 | LaPrade et al. |
| 6,613,411 | B2 | | 9/2003 | Kollaja et al. |
| 2004/0246386 | A1 | * | 12/2004 | Thomas ............ B32B 7/06 348/818 |
| 2009/0186181 | A1 | * | 7/2009 | Mase ............ B29C 63/02 428/40.1 |
| 2010/0092713 | A1 | * | 4/2010 | Bullard ............ B41M 1/12 428/40.1 |
| 2011/0267793 | A1 | * | 11/2011 | Cohen ............ B29C 63/0047 361/807 |

FOREIGN PATENT DOCUMENTS

| | | |
|---|---|---|
| KR | 10-2006-0022825 | 3/2006 |
| KR | 10-2006-0022952 | 3/2006 |
| KR | 10-2006-0094268 | 8/2006 |

\* cited by examiner

PROTECTIVE FILMS FOR ELECTRONIC DEVICES

CROSS-REFERENCE TO RELATED APPLICATIONS

This application is a continuation of U.S. patent application Ser. No. 13/223,713, filed on Sep. 1, 2011, titled PROTECTIVE COVERING FOR AN ELECTRONIC DEVICE, which claims the benefit of U.S. Provisional Patent Application No. 61/379,151 filed on Sep. 1, 2010, titled DRY APPLIED CELL PHONE FILM. The entire disclosure of each of the foregoing patent applications is hereby incorporated herein.

TECHNICAL FIELD

The present invention relates generally to a protective cover for electronic devices and particularly a cover that improves and simplifies installation of the protective cover on such devices.

RELATED ART

In recent years, technological developments have resulted in an explosion of electronic devices used in numerous facets of commercial and every day activities. Specifically, due to advances in technology and improvements in methods of manufacture, portable electronic devices, such as cell phones, smart phones, or tablet computers, for example, have become affordable for a significantly greater percentage of the population and are used for an increased variety of purposes. Due to the common use of these devices, they are prone to scratching or damage from use. Different types of coverings used to protect the surfaces of these electronic devices and, in particular, the data display screens associated with these devices, have evolved from hard, thick covers to thin flexible films applied directly to the surface of the device. The protective covers are intended to preserve the quality of the display as well as the overall quality of the device over time.

Application of these films, however, has posed significant challenges for users. For example, many types of films have an adhesive disposed about a surface of the film to facilitate tacking or adherence of the film to the device. A removable protective layer, sometimes referred to as a release liner, has been used to cover the adhesive until the user is ready to apply the film to the device. An example of release liners and films is disclosed in U.S. Pat. No. 6,613,411 which is incorporated herein by reference in its entirety.

Release liners, such as those described above, are used for a wide variety of films and sheet material: graphic films, screen protectors, address labels, wound protecting bandages, medical tapes, decals, optical tapes, and paint protection films. While release liners serve the purpose of protecting the adhesive, a single liner often makes installation of the main product difficult in several ways. For example, in the case of protection films, removing the release liner prior to installation leaves the adhesive exposed to dust, lint, and fingerprints. Without liquid, smoothly laying down the film in the correct position upon the first adherence is nearly impossible. To attempt a successful dry installation of a protection film, the film must slowly be tacked down from one side while the other side remains elevated. This makes alignment very difficult and leaves the film susceptible to dust and fingerprints. In other cases, the film may be aligned properly but may entrain air pockets or other undesirable matter. Still other problems are encountered during installation of the film due to the elasticity inherent in films. Specifically, while installing a film, a user will often stretch the film so that it extends beyond its intended length.

Some have attempted to solve this problem by rolling back the release liner and aligning the exposed adhesive portion correctly before removing the remaining liner and then tacking down the rest of the material moving to the opposite end. Others have attempted to adhere a larger material over the covering so that it can be handled and placed down without touching the covering or its adhesive side once the release liner is fully removed. In each case, however, there is no fully reliable system for correct alignment on the first attempt. In the case of a larger material over the covering that can be temporarily tacked down, the alignment issue is only partially solved, and there is not a simple method for removing the liner once in place without fully exposing the adhesive coating. Thus, there is a need for an improved method which allows for easy, proper alignment of a material to be adhered and easy removal of the liner while also protecting the adhesive from exposure to lint, dust, and fingerprints in the process.

SUMMARY

In light of the problems and deficiencies inherent in the prior art, the present invention seeks to overcome these by providing an improved device and method for covering an electronic device. Generally speaking, in accordance with one embodiment of the invention, a cover has a first layer comprising a film with opposing first and second sides, the film being configured to cover an outer surface of an electronic device. A second layer is provided which is removably disposed about a first portion of the first side of the film. A third layer is also provided and is removably disposed about a second portion of the first side of the film. The portion of the film covered by the second layer is greater than the portion of the film covered by the third layer. The third layer also comprises a tab member disposed about an edge of the third layer. A center axis of the tab member is substantially collinear with a center axis of the third layer.

In another embodiment of the invention, a cover for an electronic device is provided with a first layer comprising a flexible film having opposing first and second sides. As with the embodiment above, the film is configured to cover an outer surface of an electronic device. The cover also comprises a second flexible layer removably disposed about substantially all of the first side of the film. Additionally, a third substantially rigid or semi-rigid layer is disposed on a portion of the second layer, wherein said portion covers less than fifty percent of the second layer. A center axis of the third layer is substantially collinear with a center axis of the second layer.

In another embodiment of the invention, a cover for an electronic device is provided with a first layer comprising a flexible film having opposing first and second sides. The cover further comprises a second flexible layer removably disposed about substantially all of the first side of the film. A groove is installed across the second layer substantially perpendicular to a center axis of the second layer. The groove is configured to permit a user to fold the second layer at the groove to provide a tab member.

In another embodiment of the invention, a cover for an electronic device is provided with a first layer comprising a flexible film having opposing first and second sides. The cover further comprises a second flexible layer removably disposed about substantially all of the first side of the film. Additionally, the cover has a substantially inelastic third layer removably disposed about substantially all of the second side of the film. The third layer is more rigid than the second layer so as to facilitate simultaneous folding of the second and third layers to create a tab member while exposing a portion of the film for tacking.

In one embodiment of the invention, a method of covering an electronic device is disclosed. The method comprises obtaining a first layer comprising a flexible film with opposing first and second sides. The method further comprises obtaining a second flexible layer, the second layer being removably disposed about substantially all of the first side of the film. The method further comprises obtaining a third substantially inelastic layer, wherein the third layer is removably disposed about substantially all of the second side of the film. The third layer is more rigid than the second layer and facilitates folding of the second layer away from the first layer. The method further comprises folding an end portion of the second layer away from the first layer to create a tab member while simultaneously exposing a portion of the first layer for tacking to a device.

DETAILED DESCRIPTION

Figure 1:
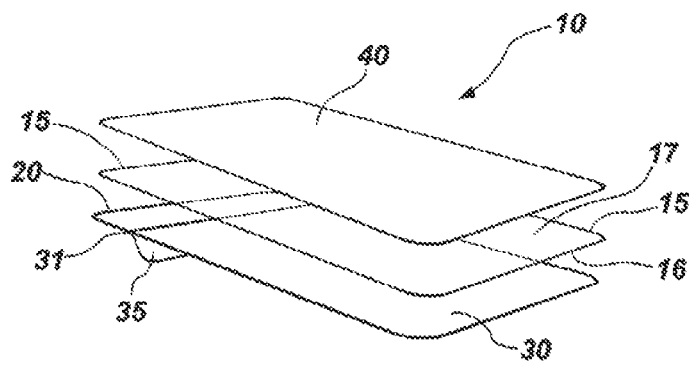
FIG. 1 is a perspective view of a protective cover according to one embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only to describe the features and characteristics of the present invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Certain embodiments of the present invention provide, as a new article of manufacture, a release liner system that allows for easy alignment of a film or sheet material on a given substrate that also prevents touching of the adhesive coating and protects it from stray dust, lint, or debris during the installation of the product. The film or sheet material may be installed numerous ways. In one embodiment, a split liner of two or more pieces of release liner is disposed on the same side of the film. One of the component release liners has an access tab that can be used to facilitate its fingerprint-free removal. The other component is removed to expose a portion of the film that may adhere to the electronic device. The adhered portion and complementary tabbed portion facilitate proper alignment of the film. Once alignment is complete, the exposed film is tacked down as the remaining release liner is removed by means of the access tab. Advantageously, the addition of a tab on an edge (i.e., a top, side, or bottom edge) of the release liner that folds back on the liner allows for simple removal of the liner while tacking down the film on an electronic device. The specific placement of the tab on the liner facilitates proper alignment while tacking down the film. Exemplary devices include, but are not limited to, cellular telephones, digital music players, audio recorders, laptop computers, personal digital assistants, satellite radios, watches, GPS devices, digital cameras, portable DVD players, portable gaming systems, tablet computers, touch screen displays, and the like. The devices typically include a screen wherein data is displayed, however, a device without a screen is also contemplated herein.

The present invention provides several significant advantages over prior related protective covers. Many advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

Figure 2A:
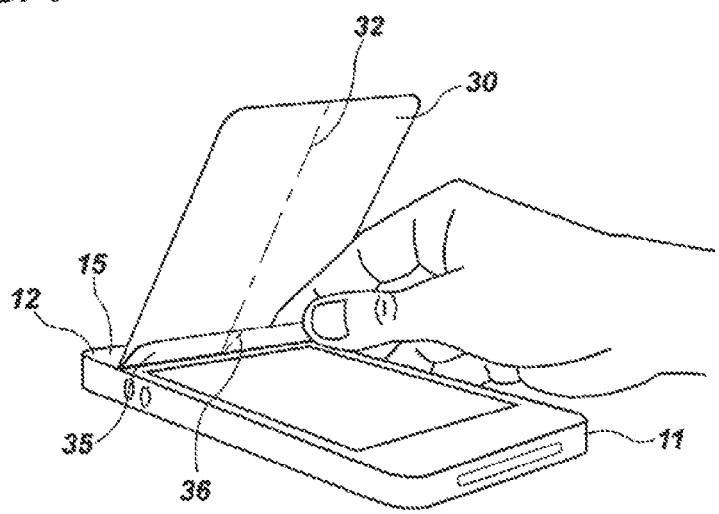
FIGS. 2A and 2B are perspective views illustrating placement of a protective cover on a surface of a device according to one embodiment of the present invention.
Figure 2B:
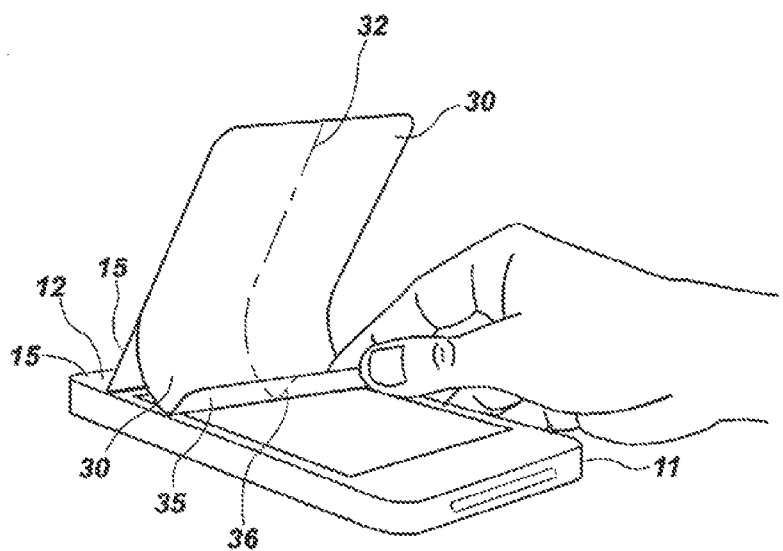

With reference now to FIGS. 1, 2A and 2B, a protective cover 10 is shown having a first layer comprising a film 15 configured to cover an outer surface of an electronic device 11. The film 15 comprises a material which is scratch resistant and transparent so as to permit the user to continue to view a screen display or other features of the device while avoiding scratches or other unwanted surface defects. The film 15 has opposing first 16 and second 17 sides. A second layer 20 is removably disposed about a first portion of the first side 16 of the film 15. A third layer 30 is removably disposed about a second portion of the first side 16 of the film 15. The portion of the film 15 covered by the second layer 20 is greater than the portion of the film 15 covered by the third layer 30. The third layer 30 comprises a tab member 35 disposed about an edge 31 of the third layer 30. The tab member 35 is placed on the third layer 30 such that a center axis 36 of the tab member 35 is substantially collinear with a center axis 32 of the third layer 30.

In one aspect of the invention, the film 15 is made of an optically clear material of a scratch resistant type such as polyvinyl, polyurethane, or polycarbonate. Film thicknesses may range from between 2 and 16 mils (or thousandths of an inch). The second 20 and third 30 layers are made from silicone coated paper or coated polyester and range in thicknesses from between 1 and 10 mils. One of skill in the art, however, will appreciate that numerous different types of materials and different thicknesses can be used for the above-referenced layers which achieve the same functionality.

Figure 3:
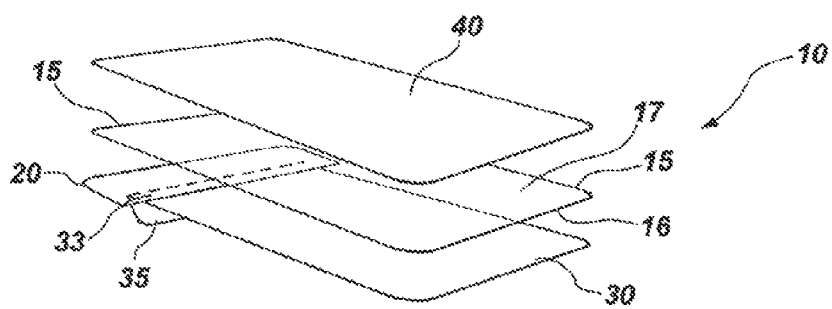
FIG. 3 is a perspective view of a protective cover according to one embodiment of the present invention.
Figure 4:
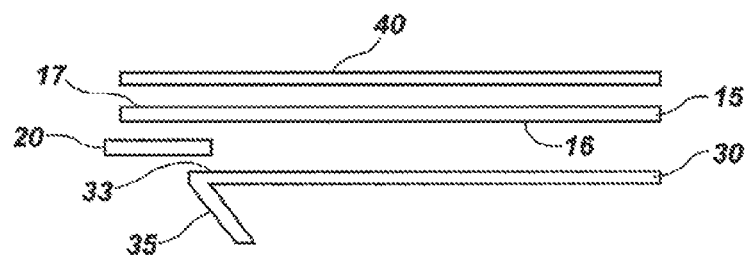
FIG. 4 is a side view of the protective cover illustrated in FIG. 3.

While not necessary to the invention, an adhesive material (such as a pressure sensitive adhesive) is disposed about the first side 16 of the film 15. One of ordinary skill in the art will recognize, however, that the film 15 may be applied or tacked to the surface of the electronic device 11 using an adhesive, by heat bonding, pressure bonding, and the like. The pressure sensitive adhesive facilitates tacking or securing the film 15 to the electronic device 11 or other desired surface. In one aspect of the invention, the second layer 20 is removed from the film 15 thereby exposing the adhesive. A user may then secure the portion of the film 15 exposed on an edge of an electronic device 11 as suits a particular application. In one aspect of the invention, the user may secure the exposed portion of the film 15 to a top edge 12 of an electronic device 11. The user may then grab the tab member 35 and remove the third layer 30 by pulling downward in the direction that the film 15 is to be installed on the electronic device 11. Once the film 15 is tacked down onto the electronic device 11, removal is cumbersome and damaging to the film 15. In many instances, the film 15 becomes unusable and/or surface imperfections are introduced onto the film 15. Because a center axis 36 of the tab member 35 is collinear with a center axis 32 of the third layer 30 (which may be collinear with the center axis through the length of the electronic device 11) the film 15 is more easily aligned prior to tacking the majority of the film 15 to the surface of the electronic device 11. In this manner, the user avoids improper application of the film 15 and can remove and realign small portions of the film 15 if initially improperly installed. Additionally, the user is permitted to align and secure the film 15 to the electronic device 11 without having to touch the adhesive bearing side of the film 15. In this manner, no fingerprints are left on the adhesive and no portion of the adhesive is inadvertently removed by the user's touch. Moreover, the tab member 35 allows the user to remove the second layer 20 without touching the film 15 beneath the second layer 20. Additionally, as shown in FIGS. 3 and 4, a portion of the second layer 20 may be disposed beneath a portion of the third layer 30. In this manner a lip or leading edge 33 of the top of the third layer 30 is exposed as the second layer 20 is removed facilitating ease of removal of the third layer 30.

In one aspect of the invention, a separate tab member (not shown) is also disposed about the second layer 20. In another aspect, the second layer 20 may simply extend beyond an outer perimeter of the film 15 providing the user with something to hold onto during removal of the second layer 20. The tab member 35 of the third layer 30 extends across substantially an entire top edge of the third layer 30. Put another way, the tab member 35 is as wide as the third layer 30. This limitation, however, is not required so long as the central axis 32 (FIGS. 2A and 2B) of the third layer 30 is collinear with the central axis 36 (FIGS. 2A and 2B) of the tab member 35. In one embodiment of the invention, in the event that the third layer 30 is rectangular, the tab member 35 is substantially collinear with a center longitudinal axis of the third layer 30. In another aspect of the invention, the tab member 35 extends across an entire side edge of the third layer 30.

In still another embodiment, the tab member 35 is shaped to approximate the portion of the film 15 that is covered by the second layer 20. Advantageously, during manufacturing, the third layer 30 may be cut as a single member which is shaped to approximate the film 15. In this manner, a separate manufacturing step may be avoided or the same die may be used to cut the film 15 as is used to cut the third layer 30. However, the tab member 35 may extend beyond the perimeter of the film 15 and may not be shaped to approximate the film 15 as suits a particular application or need.

In another embodiment, the cover may also comprise a fourth layer 40 (FIGS. 1, 3, and 4) removably disposed about the second side 17 of the film 15. The fourth layer 40 comprises a substantially inelastic material that ranges in thickness from between 0.5 to 5 mils. During installation of the first sides 16 of the films 15 on electronic devices, it is common for users to place an amount of force to the film 15 that is parallel to the planar surface of the film 15. This often results in stretching of the film 15 during application due to the film 15's inherent elasticity. Because the film 15 is sized to approximate the shape of the surface to be covered, undue stretching also results in misapplication of the film 15. This overstretching of the film 15 results in the same problems referenced above, including removal and reapplication of a film 15 that has already been secured to a surface with an adhesive. Advantageously, use of a fourth layer 40 removably disposed about the second side 17 of the film 15 minimizes overstretching of the film 15 during application when the fourth layer 40 is inelastic and assists in proper alignment. Because the fourth layer 40 is removed after the film 15 is secured in place, it may be labeled with company logos or branding to identify the cover where labeling on the film 15 itself is not feasible.

An additional advantage of the fourth layer 40 is recognized during manufacture of the protective cover 10. A method of manufacturing and/or creating a tab member 35 associated with the protective cover 10 described herein, includes placement of a release liner (i.e., the third layer 30) about the adhesive-treated side of the film 15 and then folding back a portion of the release liner 30 away from the film 15 to create the tab member 35. Due to the film 15's inherent flexibility and elasticity, manipulation of the third layer 30 to create the tab member 35 can be extremely difficult. With the added rigidity of the fourth layer 40 as well as the ability to contact the surface of the fourth layer 40 without damage to its surface, manipulation of the protective cover 10 create the tab member 35 is simplified.

It is to be understood that the fourth layer 40 may come in numerous shapes and sizes and still fall within the spirit and scope of the invention. That is, the fourth layer 40 may be sized to approximate the entire shape of the film 15 (i.e., the first layer) or it may have a different shape so long as it functions to minimize stretching of the film 15 during application. For example, the fourth layer 40 may extend substantially from a top portion of the film 15 to a bottom portion of the film 15 but may be narrower than the width of the film 15. The fourth layer 40 in this example is positioned such that during installation, the user grabs the fourth layer 40. In this aspect of the invention, a center axis of the fourth layer 40 is collinear with a center axis of the film 15. The fourth layer 40 is made from polyester or some other suitable material that exhibits less elasticity than the film 15.

Figure 5:
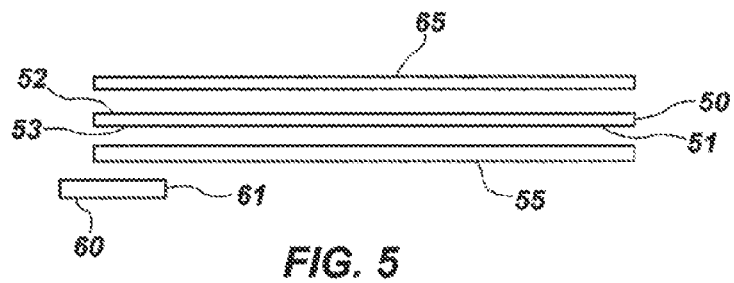
FIG. 5 is a side view of a protective cover according to one embodiment of the present invention.

Referring now to FIG. 5, in another embodiment of the present invention, a cover for an electronic device is disclosed with a first layer comprising a film 50 having opposing first and second sides. The film 50 is flexible. As with the film 15 above, the film 50 is configured to cover an outer surface of an electronic device. A second layer 55, which is flexible, is shown removably disposed about substantially all of the first side 51 of the film 50. A third layer 60 comprising a rigid or semi-rigid material (such as plastic or rubber) is affixed to an end portion of the second layer 55. The third layer 60 ranges generally from 1 to 25 mils and may be permanently affixed to the second layer 55 or integrally formed with the second layer 55 during manufacture, though one of ordinary skill in the art will recognize that it may be thinner or thicker as suits a particular purpose. In one aspect, the third layer 60 may comprise a hard plastic or rubber material enabling simplified folding of the second layer 55 and third layer 60 to create a tab member.

In one aspect of the invention, the third layer 60 covers less than fifty percent of the second layer 55 and wherein a center axis of the third layer 60 is substantially collinear with a center axis of the second layer 55. In a different embodiment, the third layer 60 covers less than 25 percent of the second layer 55 and in still a different embodiment, the third layer 60 covers less than 10 percent of the second layer 55. Advantageously, the third layer 60 provides a surface for the user to fold at a bottom edge of the third layer 60 thereby creating a tab member out of the second layer 55 and the third layer 60 for alignment and installation of the film 50. Simultaneously, as the second layer 55 and the third layer 60 are folded, an area of the film 50 beneath the folded area 53 is exposed for adhesion to a surface of a device. Progressively smaller areas which cover the second layer 55 provide progressively smaller areas of the film 50 that are exposed for adhesion to the surface of a device. Smaller areas provide for minimized exposure to unwanted contact with the film 50 prior to tacking of the film 50.

In an additional aspect of the invention, the third layer 60 is configured such that a top edge of the third layer 60 is substantially parallel with a top edge of the second layer 55. Moreover, opposing side surfaces of the third layer 60 are substantially parallel with opposing side surfaces of the second layer 55 and a bottom edge 61 of the third layer 60 is substantially perpendicular to a center axis of the second layer 55. In the event that the third layer 60 is substantially rectangular, a center longitudinal axis of the third layer 60 is perpendicular to a center axis of the second layer 55. In one aspect of the invention, a fourth layer 65 is removably disposed about a portion of the second side 52 of the film 50. In one aspect of the invention, the fourth layer 65 comprises a substantially inelastic material. As with the embodiment referenced above, the substantially inelastic material minimizes overstretching of the film 50 during installation.

Figure 6:
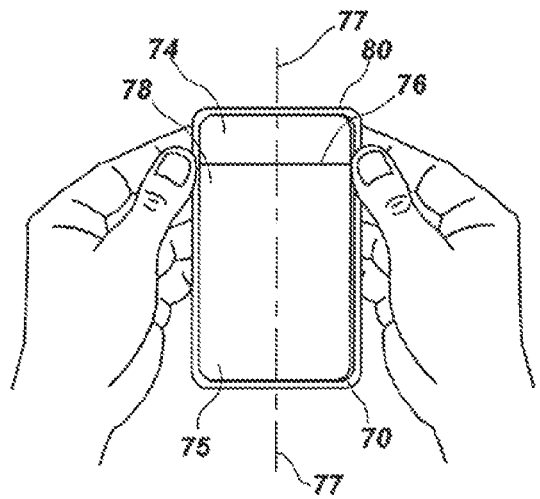
FIG. 6 is a front view of a protective cover according to one embodiment of the present invention.

Referring now to FIG. 6, a cover for an electronic device is provided having a first layer comprising a film 70 with opposing first and second sides. The film 70 is flexible. As with the films in the other embodiments, the film 70 is configured to cover an outer surface of an electronic device. A second layer 75, which is flexible, is removably disposed about substantially all of the first side of the film 70. A groove 76 is installed across the second layer 75 perpendicular to a center axis 77 of the second layer 75. In one aspect, the groove 76 does not penetrate the entire thickness of the second layer 75 so as to avoid scoring of the first layer 70. The groove 76 creates a predetermined fold line to enable a user to fold the second layer 75 at the groove 76 thereby creating a tab member and also defining a first portion 74 and a second portion 78 of the second layer 75. In one aspect of the invention, a center axis of the tab member is collinear with a center axis of the second layer 75. The tab may be as long as the second layer 75 itself and wide enough so that a user may grasp it between the thumb and forefinger. For example, the tab may be from 0.25 to 1 inch wide. In one aspect of the invention, opposing side edges of the first portion 74 extend beyond the side edge of the film 70 and in others the tab may be contained within and/or be smaller than the width of the film 70. Additionally, a third substantially inelastic layer 80 is removably disposed about a second side of the film 70 to provide a stabilizing member during application to minimize overstretching of the film 70.

Referring still to FIG. 6, in another embodiment of the invention, the third substantially inelastic layer 80 is more rigid than the second layer 75 facilitating folding of the second layer 75 to create a tab member. In one aspect of the invention, a method of covering an electronic device by an end user is provided. The method comprises the steps of obtaining a first layer 70 comprising a flexible film with a second flexible layer 75 removably disposed thereon. The third layer 80, which is substantially inelastic, is removably disposed on the film (or first layer) 70 opposite the side having the second layer 75. Because the third layer 80 is more rigid than the second layer 75, a user may grab a portion of the second layer 75 by an end and fold it over against itself to create a tab member for use in installing the film 70 on a surface of a device while simultaneously exposing a portion of the film 70 for tacking to the device. It is to be understood that different folds may be made at different portions of the second layer 75 without departing from the spirit and scope of the invention. For example, a fold may be made across a top portion of the second layer 75, a side portion of the second layer 75, or a bottom portion of the second layer 75, so long as the line of the fold is perpendicular to the direction in which the film 70 is to be installed on the device. Advantageously, the third layer 80 stabilizes the cover allowing the user to more easily fold the second layer 75 away from the film 70. Additionally, as discussed in more detail above, the third layer 80 also minimizes over-stretching of the film 70 and problems attendant to stretching.

It is to be understood that the above-referenced arrangements are illustrative of the application for the principles of the present invention. Numerous modifications and alternative arrangements and procedures can be devised without departing from the spirit and scope of the present invention while the present invention has been shown in the drawings and described above in connection with the exemplary embodiments of the invention. It will be apparent to those of ordinary skill in the art that numerous modifications and alternative protective covers can be made without departing from the principles and concepts of the invention as set forth in the claims.

What is claimed:

1. A method for protecting a surface of an electronic device, comprising:

removing a strip element of a liner from a peripheral portion of a back side of a protective film to expose adhesive on a strip of the peripheral portion of the back side of the protective film, the strip element of the liner being detached from a main element of the liner, a majority of the back side of the protective film remaining covered by the main element of the liner;

aligning the strip of the peripheral portion of the back side of the protective film with a corresponding location on a peripheral portion of the surface of the electronic device;

securing the strip of the peripheral portion of the back side of the protective film to the corresponding location on the peripheral portion of the surface of the electronic device with the adhesive on the strip of the peripheral portion of the back side of the protective film while the main element of the liner prevents a portion of the protective film superimposed with the main element from being secured in place relative to the surface of the electronic device;

with the strip of the peripheral portion of the back side of the protective film properly aligned with and secured to the corresponding location on the peripheral portion of the surface of the electronic device, grasping the main element of the liner to remove the main element of the liner from the majority of the back side of the protective film, securing the majority of the back side of the protective film to a remainder of the surface of the electronic device with a remainder of the adhesive on the majority of the back side of the protective film.

2. The method of claim 1, wherein the surface of the electronic device is visible through the protective film.

3. The method of claim 2, wherein:
aligning the strip of the peripheral portion of the back side of the protective film with the corresponding location on the peripheral portion of the surface of the electronic device comprises aligning the strip of the peripheral portion of the back side of the protective film with a corresponding location on a peripheral portion of a display screen of the electronic device;
securing the strip of the peripheral portion of the back side of the protective film to the corresponding location on the peripheral portion of the surface of the electronic device comprises securing the strip of the peripheral portion of the back side of the protective film to the corresponding location on the peripheral portion of the display screen of the electronic device; and
securing the majority of the back side of the protective film to the remainder of the surface of the electronic device comprises securing the majority of the back side of the protective film to a remainder of the display screen of the electronic device.

4. The method of claim 3, wherein securing the majority of the back side of the protective film to the remainder of the surface of the electronic device includes:
lifting an edge of the protective film opposite from the strip of the peripheral portion of the back side of the protective film away from the remainder of the surface of the electronic device.

5. The method of claim 4, wherein securing the majority of the back side of the protective film to the remainder of the surface of the electronic device further includes:
grasping an edge of the main element of the liner located adjacent to the strip of the peripheral portion of the back side of the protective film; and
pulling the edge of the main element of the liner away from the strip of the peripheral portion of the back side of the protective film to continuously expose portions of the majority of the back side of the protective film and to progressively secure the portions of the majority of the back side to the remainder of the surface of the electronic device.

6. The method of claim 1, wherein securing the strip of the peripheral portion of the back side of the protective film to the corresponding location on the peripheral portion of the surface of the electronic device comprises securing the strip of the peripheral portion of the back side to an edge of the surface of the electronic device.

7. The method of claim 1, further comprising:
removing the strip of the peripheral portion of the back side of the protective film from the corresponding location on the peripheral portion of the surface of the electronic device;
realigning the strip of the peripheral portion of the back side of the protective film with the corresponding location on the peripheral portion of the surface of the electronic device; and
repositioning the strip of the peripheral portion of the back side of the protective film on the corresponding location on the peripheral portion of the surface of the electronic device.

8. The method of claim 7, wherein the acts of removing, realigning and repositioning occur while an individual manually holds the main element of the liner and the protective film without the individual touching the strip of the peripheral portion of the back side of the protective film.

9. The method of claim 1, wherein removing the strip element of the liner comprises:
grasping a tab protruding from an edge of the strip element of the liner; and
while holding the tab, peeling the strip element of the liner from the strip of the peripheral portion of the back side of the protective film.

10. The method of claim 9, wherein grasping the tab comprises grasping a tab protruding beyond a periphery of the protective film.

11. The method of claim 9, wherein grasping the tab enables an individual to remove the strip element of the liner from the strip of the peripheral portion of the back side of the protective film without touching the adhesive on the strip of the peripheral portion of the back side of the protective film.

12. A method for protecting a surface of an electronic device, comprising:
removing a strip element of a liner from a peripheral portion of a back side of a protective film to expose adhesive on a strip of the peripheral portion of the back side of the protective film, the strip element of the liner being detached from a main element of the liner, a majority of the back side of the protective film remaining covered by the main element of the liner;
aligning the strip of the peripheral portion of the back side of the protective film with a corresponding location on a peripheral portion of the surface of the electronic device;
securing the strip of the peripheral portion of the back side of the protective film to the corresponding location on the peripheral portion of the surface of the electronic device without securing a portion of the protective film superimposed with the main element in place relative to the surface of the electronic device;
with the strip of the peripheral portion of the back side of the protective film properly aligned with and secured to the corresponding location on the peripheral portion of the surface of the electronic device, grasping the main element of the liner to remove the main element of the liner from the majority of the back side of the protective film, securing the majority of the back side of the protective film to a remainder of the surface of the electronic device.

13. The method of claim 12, wherein the surface of the electronic device is visible through the protective film.

14. The method of claim 13, wherein:
aligning the strip of the peripheral portion of the back side of the protective film with the corresponding location on the peripheral portion of the surface of the electronic device comprises aligning the strip of the peripheral portion of the back side of the protective film with a corresponding location on a peripheral portion of a display screen of the electronic device;
securing the strip of the peripheral portion of the back side of the protective film to the corresponding location on the peripheral portion of the surface of the electronic device comprises securing the strip of the peripheral portion of the back side of the protective film to the corresponding location on the peripheral portion of the display screen of the electronic device; and
securing the majority of the back side of the protective film to the remainder of the surface of the electronic device comprises securing the majority of the back side of the protective film to a remainder of the display screen of the electronic device.

15. The method of claim 14, wherein securing the majority of the back side of the protective film to the remainder of the surface of the electronic device includes:

lifting an edge of the protective film opposite from the strip away from the remainder of the surface of the electronic device.

16. The method of claim 15, wherein securing the majority of the back side of the protective film to the remainder of the surface of the electronic device further includes:

grasping an edge of the main element of the liner located adjacent to the strip of the peripheral portion of the back side of the protective film; and pulling the edge of the main element of the liner away from the strip of the peripheral portion of the back side of the protective film to continuously expose portions of the majority of the back side of the protective film and to progressively secure the portions of the majority of the back side to the remainder of the surface of the electronic device.

17. The method of claim 12, wherein securing the strip of the peripheral portion of the back side of the protective film to the corresponding location on the peripheral portion of the surface of the electronic device comprises securing the strip of the peripheral portion of the back side of the protective film to an edge of the surface of the electronic device.

18. The method of claim 12, further comprising:

removing the strip of the peripheral portion of the back side of the protective film from the corresponding location on the peripheral portion of the surface of the electronic device;

realigning the strip of the peripheral portion of the back side of the protective film with the corresponding location on the peripheral portion of the surface of the electronic device; and repositioning the strip of the peripheral portion of the back side of the protective film on the corresponding location on the peripheral portion of the surface of the electronic device.

19. The method of claim 18, wherein the acts of removing, realigning and repositioning occur while an individual manually holds the main element of the liner and the protective film without the individual touching the strip of the peripheral portion of the back side of the protective film.

20. The method of claim 12, wherein removing the strip element of the liner comprises:

grasping a tab protruding from an edge of the strip element of the liner; and while holding the tab, peeling the strip element of the liner from the strip of the peripheral portion of the back side of the protective film.

21. The method of claim 20, wherein grasping the tab comprises grasping a tab protruding beyond a periphery of the protective film.

22. The method of claim 20, wherein grasping the tab enables an individual to remove the strip element of the liner from the strip of the peripheral portion of the back side of the protective film without touching the strip of the peripheral portion of the back side of the protective film.

* * * * *